(12) United States Patent
Thomson et al.

(10) Patent No.: US 7,250,688 B2
(45) Date of Patent: Jul. 31, 2007

(54) NARROW RANGE VARIABLE FREQUENCY STARTER/GENERATOR SYSTEM

(75) Inventors: Scott M. Thomson, Rockford, IL (US); Douglas J. Turner, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 222 days.

(21) Appl. No.: 10/891,092

(22) Filed: Jul. 14, 2004

(65) Prior Publication Data

US 2006/0012179 A1 Jan. 19, 2006
US 2006/0249956 A9 Nov. 9, 2006

(51) Int. Cl.
F02N 11/04 (2006.01)
F02N 11/06 (2006.01)
H02K 23/52 (2006.01)
H02P 9/04 (2006.01)

(52) U.S. Cl. .................. 290/34; 290/31; 290/40 R

(58) Field of Classification Search .................. 290/34, 290/31, 4 R, 46, 38 R, 40 R; 322/29; 180/65.2
See application file for complete search history.

(56) References Cited

U.S. PATENT DOCUMENTS

| | | | | |
|---|---|---|---|---|
| 4,743,776 A | * | 5/1988 | Baehler et al. | 290/31 |
| 4,967,096 A | * | 10/1990 | Diemer et al. | 307/19 |
| 5,028,803 A | * | 7/1991 | Reynolds | 290/31 |
| 5,555,722 A | * | 9/1996 | Mehr-Ayin et al. | 60/788 |
| 5,828,136 A | * | 10/1998 | Yang | 290/4 A |
| 5,982,045 A | * | 11/1999 | Tabata et al. | 290/17 |
| 6,396,165 B1 | * | 5/2002 | Nagano et al. | 307/10.6 |
| 6,441,506 B2 | * | 8/2002 | Nakashima | 290/40 C |
| 6,735,951 B2 | * | 5/2004 | Thompson | 60/774 |
| 6,838,778 B1 | * | 1/2005 | Kandil et al. | 290/31 |
| 6,838,779 B1 | * | 1/2005 | Kandil et al. | 290/31 |
| 6,931,318 B2 | * | 8/2005 | Kaita et al. | 701/113 |
| 2006/0012180 A1 | * | 1/2006 | Hoppe et al. | 290/38 R |

* cited by examiner

Primary Examiner—Julio C. Gonzalez
(74) Attorney, Agent, or Firm—Stephen G. Mican

(57) ABSTRACT

A starter/generator system for a gas turbine engine used in aeronautical applications that couples a single dynamoelectric machine to the gas turbine engine through a torque converter in a starting mode, and engages the engine to the dynamoelectric machine through a mechanical differential in a generating mode after the engine reaches self-sustaining speed and combines the output of the engine and the torque converter to regulate the frequency of AC generated by the dynamoelectric machine within a range of frequencies suitable for on-board electrical equipment by dynamically regulating the flow of hydraulic fluid to the torque converter.

20 Claims, 3 Drawing Sheets

NARROW RANGE VARIABLE FREQUENCY STARTER/GENERATOR SYSTEM

FIELD OF THE INVENTION

The invention relates to aeronautical electrical systems that comprise a dynamoelectric machine used for starting a gas turbine engine as well as generating electrical power, and more particularly to aeronautical electrical systems that use such a dynamoelectric machine in a narrow range variable frequency configuration.

BACKGROUND OF THE INVENTION

Many aircraft that use gas turbine engines for propulsion have commonly used pneumatic starters. Such aircraft have an accessory turbine air motor coupled to each propulsion engine through a gearbox with reduction gearing to crank the propulsion engine.

Compressed air, supplied by a load compressor that is part of an on-board auxiliary power unit (APU) or an external ground cart, supplies compressed air to the turbine air motor through a pneumatic starter supply system that requires numerous air ducts, seals and air valves that are bulky and heavy. Furthermore, such pneumatic starter supply systems are complex, and such complexity reduces the reliability of the aircraft and increases maintenance costs.

In recent years, electric starters have been considered for cranking gas turbine propulsion engines. Incorporating an electric start capability does not appreciable add to the cost, weight and complexity of the electrical system since the infrastructure exists and an electrical starting system can make use of the existing components and wiring.

Although a dedicated electric starter motor with a suitable overriding clutch and associated reduction gearing in the gearbox can be used as part of the electrical starting system, the most desirable approach is to use a single dynamoelectric machine that is alternatively operable as a generator or a starter motor to eliminate the need for separate machines, multiple mounting pads, additional reduction gearing in the gearbox, the overriding clutch and associated ducting and valves. Such an approach is commonly referred to as a "starter/generator" system, and such systems have been available in various forms for a number of years.

Typically, high-power electronic control equipment has been necessary to make such starter/generator systems operational in ordinary aeronautical applications. Since most aircraft architectures require alternating current for supplying on-board electrical components, such as fans, motors, pumps and electronics, an alternating current (AC) generator is generally used as a starter/generator. A high power motor controller must be used to convert the available electrical power for starting to a variable frequency AC power supplied to the starter/generator to bring the engine up to self-sustaining speed, after which the starter/generator is used in its conventional mode as a generator.

Additionally, since most on-board AC components require a power source with an AC frequency that is constant or within a range of frequencies and the AC power from the starter/generator is proportional to engine speed that may vary over a wide range, high power variable frequency (VF) to constant frequency (CF) conversion equipment is generally required. Such conversion equipment generally converts the VF AC power from the generator to direct current (DC) power and then converts the DC power to CF AC power.

The use of such high-power motor controllers and power conversion equipment increases cost, weight and complexity of the starter/generator system and it reduces reliability. Thus, an alternative approach, as described in Kandil et al., U.S. Ser. No. 10/154,942, filed 24 May 2002 and commonly owned by the assignee of this application, eliminates the use of high power motor control and power conversion equipment as part of the starter/generator by using a unique mechanical coupling system between the starter/generator and the engine that comprises a torque converter coupling the starter/generator to the engine for starting the engine and a constant speed transmission or drive coupling the engine to the starter/generator for generating power once the engine has reached self-sustaining speed.

The system as described in Kandil et al. is quite satisfactory for aircraft architectures that have all on-board electrical components operating at CF AC. However, some new architectures have on-board electrical components that require an adjustable range of frequencies, such as environmental control system (ECS) motors. The frequency of AC power for such components is adjusted according to flight conditions and requirements. For instance, the power frequency for such ECS motors changes to vary the speed of the motors to suit flight conditions as required by the ECS.

The use of the Kandil et al. starter/generator system in aircraft architectures that require adjustable VF AC power requires conversion of CF AC power to adjustable VF (AVF) AC power. Since electrical equipment, such as ECS motors, that require such AVF AC power can have significant power requirements, high power CF to AVF conversion equipment is necessary for their operation. This increases cost, weight and complexity of the system.

A co-pending application by Hoppe et al., owned by the assignee of this application, describes a starter/generator system for a gas turbine engine used in aeronautical applications that couples a single dynamoelectric machine to the gas turbine engine through a torque converter in a starting mode, and then disengages the torque converter and engages the engine to the dynamoelectric machine through an adjustable speed transmission in a generating mode after the engine reaches self-sustaining speed, wherein the speed of the adjustable speed transmission is set to match the frequency of AC generated by the dynamoelectric machine with on-board electrical equipment requirements to suit flight conditions. This system is very satisfactory for such aircraft architectures that require AVF AC power. However, in aircraft architectures that can tolerate a non-adjustable narrow range variable frequency (NRVF) AC power system, this approach is also overly complex, heavy and costly.

SUMMARY OF THE INVENTION

The invention comprises a starter/generator system for a gas turbine engine used in aeronautical applications that couples a single dynamoelectric machine to the gas turbine engine through a torque converter in a starting mode, and engages the engine to the dynamoelectric machine through a mechanical differential in a generating mode after the engine reaches self-sustaining speed and combines the output of the engine and the torque converter to regulate the frequency of AC generated by the dynamoelectric machine within a range of frequencies suitable for on-board electrical equipment by dynamically regulating the flow of hydraulic fluid to the torque converter.

In a preferred embodiment, the starter/generator system comprises: an alternating current dynamoelectric machine; a torque converter with an input shaft coupled to a drive shaft of the dynamoelectric machine; a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine in a starting mode; a mechanical differential with an input shaft coupled to the drive shaft of the engine, a trim shaft coupled to the output shaft of the torque converter, and an output shaft that has a rotational speed that is proportional to the sum of the rotational speeds of its input shaft and trim shaft; a second rotation-speed selective coupling with an input shaft coupled to an output shaft of the differential and an output shaft coupled to the drive shaft of the dynamoelectric machine, wherein the second coupling transfers power from its input shaft to its output shaft so long as the input shaft rotates at least as fast as the output shaft for coupling the engine through the differential in a generating mode; a hydraulic fluid source for selectively filling the torque converter with hydraulic fluid to transfer rotational power from the dynamoelectric machine to the engine during the starting mode; and a control unit for switching the dynamoelectric machine from a starting mode to a generating mode when the engine reaches a self-sustaining rotational speed, coupling the hydraulic source to the torque converter in the starting mode and regulating the flow of hydraulic fluid flow from the hydraulic source to the torque converter to adjust the rotational speed of the output shaft of the torque converter to keep the frequency of power generated by the dynamoelectric machine within a desired band of frequencies in the generating mode.

DETAILED DESCRIPTION OF THE INVENTION

Figure 1:
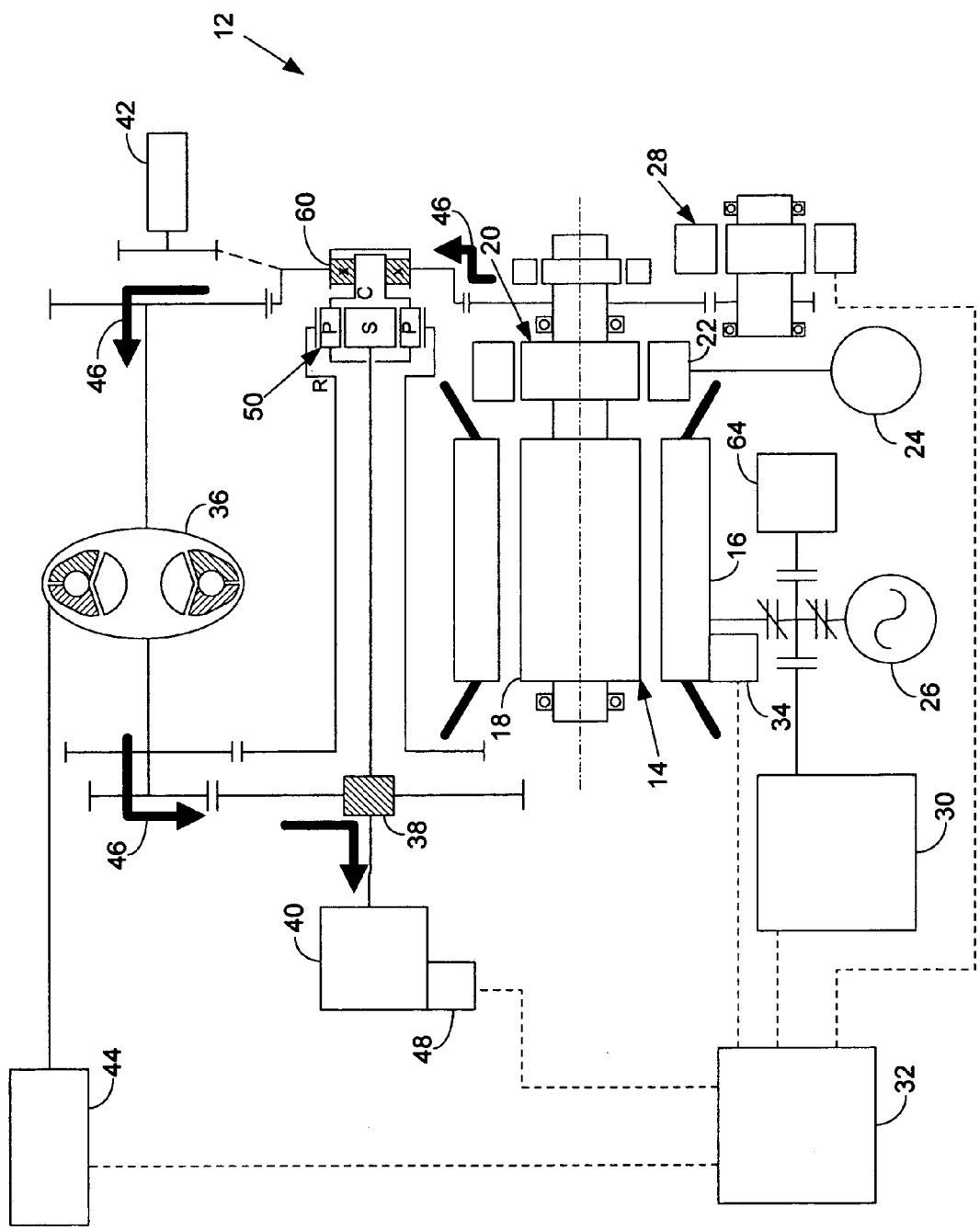
FIG. 1 is a schematic representation of a starter/generator system according to a preferred embodiment of the invention, showing the flow of mechanical power in an engine-starting mode.

FIG. 1 is a schematic representation of a starter/generator system 12 according to a preferred embodiment of the invention, showing the flow of mechanical power in an engine-starting mode. A dynamoelectric machine 14 serves as both a starter and generator in the starter/generator system 12. Application of alternating current power to a stator 16 of the dynamoelectric machine 14 creates a rotating magnetic field that rotates a rotor 18 of the dynamoelectric machine 14 when a rotor field is provided by an exciter 20 with an exciter stator 22 that is energised by a low power DC source 24. The alternating current power so supplied to the stator 16 is supplied by a suitable high power external AC source 26, such as a ground cart, auxiliary power unit (APU), or a generator of another engine.

Before AC from the external AC source 26 is applied to the stator 16, the rotor 18 is preferably brought up to speed to rotate at approximately the angular velocity of the rotating field in the stator 16 established by the AC source 26. This minimises inrush current to the stator 16 when the AC source 26 is connected. The rotor 18 may be brought up to speed by a pony or support motor 28, or by a low power motor drive 30 coupled to the stator 16. The support motor 28 may be of any convenient type, such as a permanent magnet or induction motor.

Upon start-up, an electronic control unit 32 connects the support motor 28 or motor drive 30, connects the DC source 24 to the exciter stator 22 and senses the rotary speed of the rotor 18, such as by monitoring a rotary speed signal. A suitable rotary speed signal may conveniently be generated by a conventional rotor position sensor 34. Once the rotor 18 of the dynamoelectric machine 14 is brought up to speed, the control unit 32 disconnects the support motor 28 or motor drive 30 and couples the AC source 26 to the stator 16.

A drive shaft of the dynamoelectric machine 14 couples to an input shaft of a torque converter 36. An output shaft of the torque converter 36 couples to the input of a rotation speed-selectable coupling 38, such as an overriding clutch. The output shaft of the coupling 38 couples to a shaft of a turbine propulsion engine 40.

The coupling 38 transfers power from its input shaft to its output shaft so long as the input shaft rotates at least as fast as the output shaft. Thus, the dynamoelectric machine 14 may transfer power to the engine 40 so long as the input shaft of the coupling 38 rotates at least as fast as its output shaft. The torque converter 36 provides a mechanical torque advantage and high stall torque to aid in starting the engine 40, as well as a dampening characteristic that minimises torque spikes in the power train between the dynamoelectric machine 14 and the engine 40.

The torque converter 36 selectively couples and adjusts the degree of coupling between the dynamoelectric machine 14 to the engine 40 through dynamic filling and discharge of hydraulic fluid in the torque converter 36. A hydraulic fluid source 42, such as an oil pump, supplies hydraulic fluid to the torque converter 36 through a proportional control valve 44. The hydraulic fluid source 42 also provides hydraulic fluid for cooling and lubricating the starter/generator system 12.

As the electronic control unit 32 connects the support motor 28 or motor drive 30 to drive the rotor 18, this operation rotates the hydraulic fluid source 42 to provide cooling and lubrication and rotates the input shaft of the "dry" torque converter 36. The torque converter 36 functions as an open clutch at this point. After the control unit 32 couples the AC source 26 to the stator 16 of the dynamoelectric machine 14, the control unit 32 energises the proportional control valve 44 to open it and allow hydraulic fluid to fill the torque converter 36, thus allowing the coupling of power from the dynamoelectric machine 14 to the engine 40. The mechanical power flow from the dynamoelectric machine 14 to the engine 40 during the starting mode is generally represented by arrows 46 shown in FIG. 1.

Figure 2:
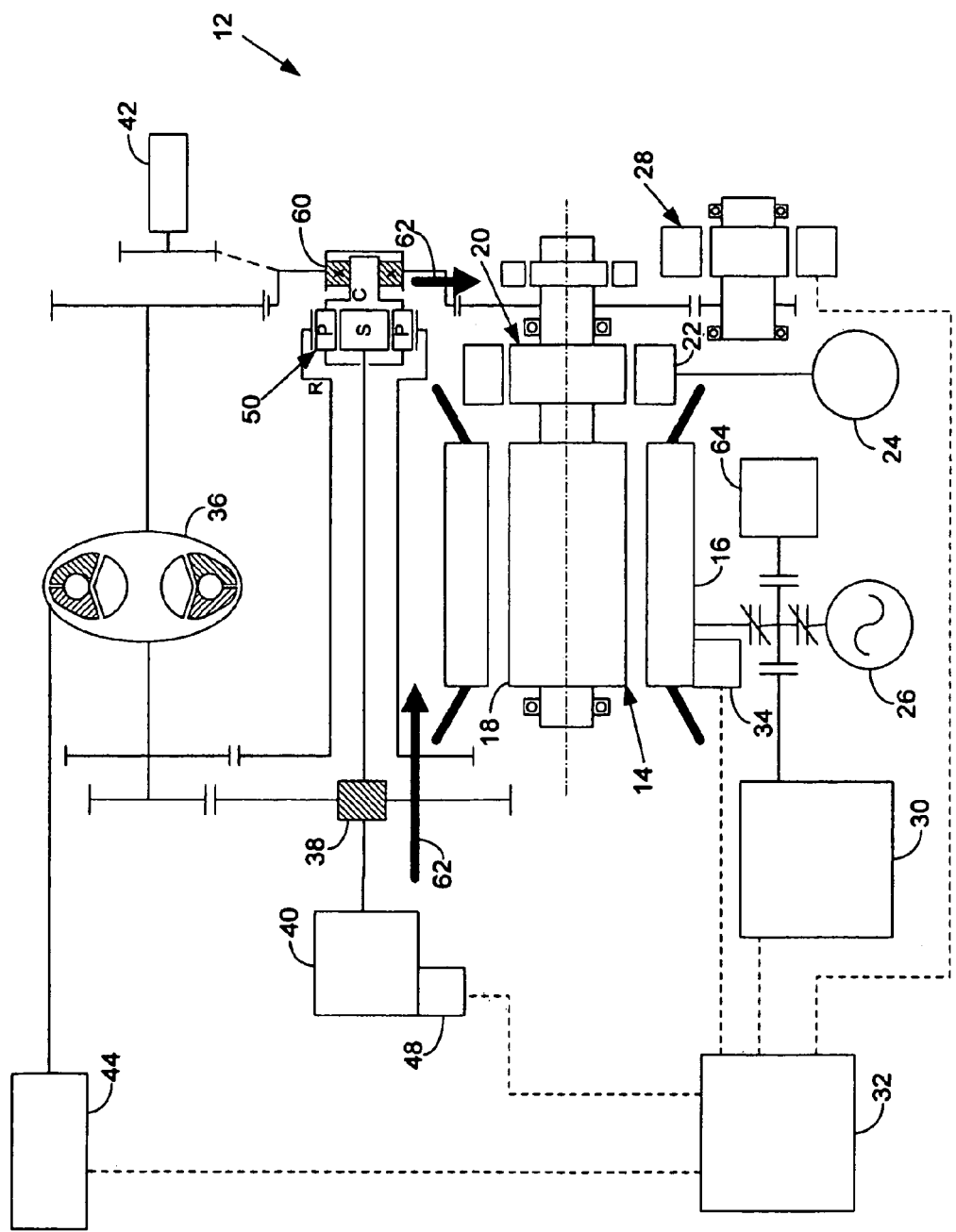
FIG. 2 is a schematic representation of a starter/generator system according to a preferred embodiment of the invention, showing the flow of mechanical power in a generating mode.

The control unit 32 senses when the engine 40 reaches a self-sustaining rotational speed, such as by monitoring an engine speed signal generated by an engine speed sensor 48. Upon reaching a self-sustaining rotational speed, the control unit 32 switches the dynamoelectric machine 14 from a starting mode to a generating mode. FIG. 2 is a schematic representation of the starter/generator system 12 that shows the flow of mechanical power in the generating mode.

When the torque converter 36 is rotating, hydraulic fluid within the torque converter 36 discharges from orifices within the housing of the torque converter 36 to a fluid sump (not shown), thereby providing a drain path to continually replace and cool the hydraulic fluid. As indicated, the control unit 32 controls the degree of coupling of the dynamoelectric machine 14 to the engine 40 by controlling the flow of hydraulic fluid from the hydraulic fluid source 42 to the torque converter 36. Thus, the degree of hydraulically coupling of the dynamoelectric machine 14 from the engine 40 through the torque converter 36 changes in proportion to the flow of hydraulic fluid through the proportional control valve 44.

Upon commencement of the generating mode, the engine speed continues to increase. Thus, the rotational velocity of the output shaft of the torque converter 36 is less than that of drive shaft of the engine 40. The coupling 38 then decouples the engine 40 from the output shaft of the torque converter 36, since the input shaft of the coupling 38 no longer rotates at least as fast as its output shaft. This reduces drag on the engine 40 when the starter/generator system 12 is in the generating mode.

Figure 3:
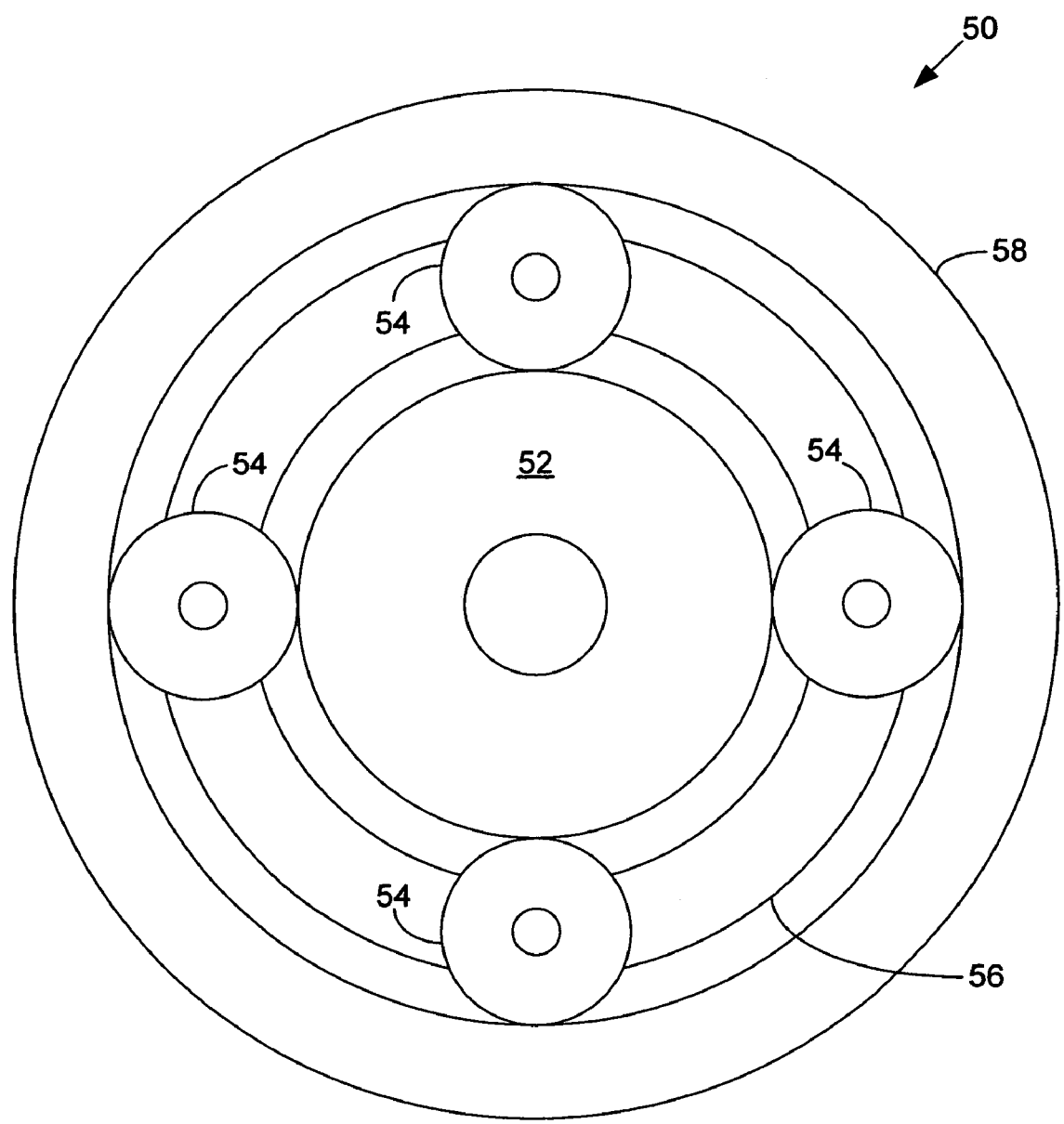
FIG. 3 is a schematic representation of a mechanical differential that is suitable for use in the starter/generator system.

An input shaft of a mechanical differential 50 couples to the drive shaft of the engine 40. The mechanical differential 50 may comprise a differential as illustrated in FIG. 3.

The input shaft of the differential 50 couples a middle sun gear 52 within the differential. A plurality of planetary gears 54, typically three, riding on an output carrier gear 56, mesh with the sun gear 52 and an outer ring gear 58. The output carrier gear 56 couples to an output shaft of the differential 50. The ring gear 58 couples to a trim shaft of the differential 50.

The trim shaft of the differential 50 couples to the output shaft of the torque converter 36. The output shaft of the differential 50 couples to the input shaft of a rotation speed-selectable coupling 60, such as an overriding clutch. An output shaft of the coupling 60 couples to the drive shaft of the dynamoelectric machine 14.

Like the coupling 38, the coupling 60 transfers power from its input shaft to its output shaft so long as the input shaft rotates at least as fast as the output shaft. Thus, the engine 40 may transfer power to the dynamoelectric machine 14 so long as the input shaft of the coupling 60 rotates at least as fast as its output shaft.

The mechanical power flow from the engine 40 to the dynamoelectric machine 14 during the generating mode is generally represented by arrows 62. As engine 40 starts to power the dynamoelectric machine 14 as a generator, the control unit 32 couples the dynamoelectric machine 14 to an electrical bus system 64 to power on-board electrical components (not shown) that tolerate a narrow range of frequencies.

The engine 40 rotates the input shaft of the differential 50, which in turn rotates the sun gear 52. The sun gear 52 rotates the planetary gears 54, which in turn rotate the carrier gear 56. The carrier gear 56 rotates the output shaft of the differential 50, which in turn drives the dynamoelectric machine 14 and the torque converter 36.

The output shaft of the torque converter 36 couples to the trim shaft of the differential 50, which in turn drives the ring gear 58 to add rotational speed to the carrier gear 56, and this in turn increases the rotational speed of the output shaft of the differential 50. This in turn increases the frequency of the power generated by the dynamoelectric machine 14 at low rotational speeds of the engine 40 as it starts up. In other words, the differential 50 sums the rotational speeds of the engine 40 and torque converter 36.

As the rotational speed of the engine 40 increases, the control unit 32 compares the frequency of the AC power provided by the dynamoelectric machine 14 with the range of frequencies required by the on-board electrical components. If the frequency of the AC power generated by the dynamoelectric machine 14 is too high, the control unit 32 controls the proportional control valve 44 to reduce the flow of fluid from the hydraulic source 42 to the torque converter 36, thereby reducing the coupling between the impeller and turbine of the torque converter 36 and reducing the rotational speed of its output shaft. Slowing the output shaft of the torque converter 36 in this way reduces the rotational speed of the output shaft of the differential 50 to maintain the frequency of the dynamoelectric machine 14 within the required range of frequencies for the on-board electrical components.

The oil flow to the torque converter 36 is reduced as the rotational speed of the engine 40 increases to maintain the desired frequency of AC power generated by the dynamoelectric machine 14. Since the power provided by the torque converter 36 for frequency control is proportional to the rotational speed of its turbine, the efficiency of the starter/generator system 12 increases as the engine 40 reaches its normal rotational speed.

Described above is a preferred embodiment of a starter/generator system for a gas turbine engine used in aeronautical applications that couples a single dynamoelectric machine to the gas turbine engine through a torque converter in a starting mode, and engages the engine to the dynamoelectric machine through a mechanical differential in a generating mode after the engine reaches self-sustaining speed and combines the output of the engine and the torque converter to regulate the frequency of AC generated by the dynamoelectric machine within a range of frequencies suitable for on-board electrical equipment by dynamically regulating the flow of hydraulic fluid to the torque converter. It should be understood that these embodiments of the invention are only illustrative implementations of the invention, that the various parts and arrangement thereof may be changed or substituted, and that the invention is only limited by the scope of the attached claims.

What is claimed is:

1. A starter/generator system for starting a gas turbine engine for aeronautical applications in a starting mode and generating alternating current (AC) power within a desired band of frequencies in a generating mode comprising:

an alternating current dynamoelectric machine;

a torque converter with an input shaft coupled to a drive shaft of the dynamoelectric machine;

a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine during the starting mode;

a mechanical differential with an input shaft coupled to the drive shaft of the engine, a trim shaft coupled to the output shaft of the torque converter, and an output shaft that has a rotational speed that is proportional to the sum of the rotational speeds of its input shaft and trim shaft;

a second rotation-speed selective coupling with an input shaft coupled to an output shaft of the differential and an output shaft coupled to the drive shaft of the dynamoelectric machine, wherein the second coupling transfers power from its input shaft to its output shaft so long as the input shaft rotates at least as fast as the output shaft for coupling the engine through the differential during the generating mode;

a hydraulic fluid source for selectively filling the torque converter with hydraulic fluid to provide rotational power from the dynamoelectric machine to the engine during the starting mode; and an electronic control unit for switching the dynamoelectric machine from the starting mode to the generating mode when the engine reaches a self-sustaining rotational speed, coupling the hydraulic source to the torque converter in the starting mode and regulating the flow of hydraulic fluid from the hydraulic source to the torque converter to adjust the rotational speed of the output shaft of the torque converter and the trim shaft of the mechanical differential to which it couples in the generating mode to keep the frequency of AC power generated by the dynamoelectric machine within the desired band of frequencies.

2. The starter/generator system of claim 1, further comprising a proportional control valve coupled between the hydraulic fluid source and the torque converter and operated by the control unit to regulate the flow of hydraulic fluid transferred from the hydraulic fluid source to the torque converter.

3. The starter/generator system of claim 1, further comprising:

an alternating current power source coupled to the dynamoelectric machine by the control unit during the starting mode; and an alternating current bus coupled to the dynamoelectric machine by the control unit during the generating mode.

4. The starter/generator system of claim 1, wherein the first and second rotation-speed selective couplings are overrunning clutches.

5. The starter/generator system of claim 1, wherein the hydraulic fluid source comprises an oil pump.

6. The starter/generator system of claim 1, further comprising a rotary position sensor for generating a rotary speed signal indicative of the rotary speed of the dynamoelectric machine; and a support motor coupled to the dynamoelectric machine for bringing the dynamoelectric machine up to a predetermined rotary speed;

wherein the control unit monitors the rotary speed signal and powers the support motor in the starting mode until the rotary speed signal indicates that the dynamoelectric machine has reached the predetermined rotary speed.

7. The starter/generator system of claim 1, further comprising a rotary position sensor for generating a rotary speed signal indicative of the rotary speed of the dynamoelectric machine; and a motor drive coupled to the dynamoelectric machine for bringing the dynamoelectric machine up to a predetermined rotary speed;

wherein the control unit monitors the rotary speed signal and powers the motor drive in the starting mode until the rotary speed signal indicates that the dynamoelectric machine has reached the predetermined rotary speed.

8. The starter/generator system of claim 1, further comprising an engine speed sensor for generating an engine speed signal indicative of the rotational speed of the engine;

wherein the control unit monitors the engine speed signal and switches the dynamoelectric machine from the starting mode to the generating mode when the engine speed signal indicates that the engine has reached the self-sustaining rotational speed.

9. A starter/generator system for starting a gas turbine engine for aeronautical applications in a starting mode and generating alternating current (AC) power within a desired band of frequencies in a generating mode comprising:

an alternating current dynamoelectric machine;

a torque converter with an input shaft coupled to a drive shaft of the dynamoelectric machine;

a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine during the starting mode;

a mechanical differential with an input shaft coupled to the drive shaft of the engine, a trim shaft coupled to the output shaft of the torque converter, and an output shaft that has a rotational speed that is proportional to the sum of the rotational speeds of its input shaft and trim shaft;

a second rotation-speed selective coupling with an input shaft coupled to an output shaft of the differential and an output shaft coupled to the drive shaft of the dynamoelectric machine, wherein the second coupling transfers power from its input shaft to its output shaft so long as the input shaft rotates at least as fast as the output shaft for coupling the engine through the differential during the generating mode;

a hydraulic fluid source for selectively filling the torque converter with hydraulic fluid to provide rotational power from the dynamoelectric machine to the engine during the starting mode;

an electronic control unit for switching the dynamoelectric machine from a starting mode to a generating mode when the engine reaches a self-sustaining rotational speed, coupling the hydraulic source to the torque converter in the starting mode and regulating the flow of hydraulic fluid from the hydraulic source to the torque converter to adjust the rotational speed of the output shaft of the torque converter and the trim shaft of the mechanical differential to which it couples during the generating mode to keep the frequency of AC power generated by the dynamoelectric machine within the desired band of frequencies;

a proportional control valve coupled between the hydraulic fluid source and the torque converter and operated by the control unit to regulate the flow of hydraulic fluid transferred from the hydraulic fluid source to the torque converter;

an alternating current power source coupled to the dynamoelectric machine by the control unit during the starting mode; and an alternating current bus coupled to the dynamoelectric machine by the control unit during the generating mode.

10. The starter/generator system of claim 9, wherein the first and second rotation-speed selective couplings are overrunning clutches.

11. The starter/generator system of claim 9, wherein the hydraulic fluid source comprises an oil pump.

12. The starter/generator system of claim 9, further comprising a rotary position sensor for generating a rotary speed signal indicative of the rotary speed of the dynamoelectric machine; and a support motor coupled to the dynamoelectric machine for bringing the dynamoelectric machine up to a predetermined rotary speed;

wherein the control unit monitors the rotary speed signal and powers the support motor in the starting mode until the rotary speed signal indicates that the dynamoelectric machine has reached the predetermined rotary speed.

13. The starter/generator system of claim 9, further comprising a rotary position sensor for generating a rotary speed signal indicative of the rotary speed of the dynamoelectric machine; and a motor drive coupled to the dynamoelectric machine for bringing the dynamoelectric machine up to a predetermined rotary speed;

wherein the control unit monitors the rotary speed signal and powers the motor drive in the starting mode until the rotary speed signal indicates that the dynamoelectric machine has reached the predetermined rotary speed.

14. The starter/generator system of claim 9, further comprising an engine speed sensor for generating an engine speed signal indicative of the rotational speed of the engine;

wherein the control unit monitors the engine speed signal and switches the dynamoelectric machine from the starting mode to the generating mode when the engine speed signal indicates that the engine has reached the self-sustaining rotational speed.

15. A starter/generator system for starting a gas turbine engine for aeronautical applications in a starting mode and generating alternating current (AC) power within a desired band of frequencies in a generating mode comprising:

an alternating current dynamoelectric machine;

a torque converter with an input shaft coupled to a drive shaft of the dynamoelectric machine;

a first rotation-speed selective coupling with an input shaft coupled to an output shaft of the torque converter and an output shaft coupled to a drive shaft of the engine, wherein the first coupling transfers power from its input shaft to its output shaft so long as the input shaft rotates at least as fast as the output shaft for coupling the dynamoelectric machine through the torque converter to the engine during the starting mode;

a mechanical differential with an input shaft coupled to the drive shaft of the engine, a trim shaft coupled to the output shaft of the torque converter, and en output shaft that has a rotational speed that is proportional to the sum of the rotational speeds of its input shaft and trim shaft;

a second rotation-speed selective coupling with an input shaft coupled to an output shaft of the differential and an output shaft coupled to the drive shaft of the dynamoelectric machine, wherein the second coupling transfers power from its input shaft to its output shaft so long an the input shaft rotates at least as fast as the output shaft for coupling the engine through the differential during the generating mode;

a hydraulic fluid source for selectively filling the torque converter with hydraulic fluid to transfer rotational power from the dynamoelectric machine to the engine during the starting mode;

an electronic control unit for switching the dynamoelectric machine from the starting mode to the generating mode when the engine reaches a self-sustaining rotational speed, coupling the hydraulic source to the torque converter in the starting mode and regulating the flow of hydraulic fluid flew from the hydraulic source to the torque converter to adjust the rotational speed of the output shaft of the torque converter and the trim shaft of the mechanical differential to which it couples during the generating mode to keep the frequency of power generated by the dynamoelectric machine within a the desired band of frequencies;

a proportional control valve coupled between the hydraulic fluid source and the torque converter and operated by the control unit to regulate the flow of hydraulic fluid transferred from the hydraulic fluid source to the torque converter;

an alternating current power source coupled to the dynamoelectric machine by the control unit during the starting mode; and an alternating current bus coupled to the dynamoelectric machine by the control unit during the generating mode.

16. The starter/generator system of claim 15, wherein the first and second rotation-speed selective couplings are overrunning clutches.

17. The starter/generator system of claim 15, wherein the hydraulic fluid source comprises an oil pump.

18. The starter/generator system of claim 15, further comprising a rotary position sensor for generating a rotary speed signal indicative of the rotary speed of the dynamoelectric machine; and a support motor coupled to the dynamoelectric machine for bringing the dynamoelectric machine up to a predetermined rotary speed;

wherein the control unit monitors the rotary speed signal and powers the support motor in the starting mode until the rotary speed signal indicates that the dynamoelectric machine has reached the predetermined rotary speed.

19. The starter/generator system of claim 15, further comprising a rotary position sensor for generating a rotary speed signal indicative of the rotary speed of the dynamoelectric machine; and a motor drive coupled to the dynamoelectric machine for bringing the dynamoelectric machine up to a predetermined rotary speed;

wherein the control unit monitors the rotary speed signal and powers the motor drive in the starting mode until the rotary speed signal indicates that the dynamoelectric machine has reached the predetermined rotary speed.

20. The starter/generator system of claim 15, further comprising an engine speed sensor for generating an engine speed signal indicative of the rotational speed of the engine;

wherein the control unit monitors the engine speed signal and switches the dynamoelectric machine from the starting mode to the generating mode when the engine speed signal indicates that the engine has reached the self-sustaining rotational speed.

* * * * *